US006853783B2

(12) United States Patent
Chiasson et al.

(10) Patent No.: US 6,853,783 B2
(45) Date of Patent: Feb. 8, 2005

(54) OPTICAL FIBER RIBBONS HAVING PREFERENTIAL TEAR PORTIONS

(75) Inventors: David W. Chiasson, Hickory, NC (US); Carl M. Whisnant, Jr., Hickory, NC (US); Craig M. Conrad, Hickory, NC (US); Karen E. Williams, Hickory, NC (US); Rodney D. Cline, Hickory, NC (US); Terry L. Ellis, Hickory, NC (US); Bradley J. Blazer, Granite Falls, NC (US)

(73) Assignee: Corning Cable Systems LLC, Hickory, NC (US)

(*) Notice: Subject to any disclaimer, the term of this patent is extended or adjusted under 35 U.S.C. 154(b) by 23 days.

(21) Appl. No.: 10/376,786

(22) Filed: Feb. 28, 2003

(65) Prior Publication Data

US 2004/0170364 A1 Sep. 2, 2004

(51) Int. Cl.[7] .................................................. G02B 6/44
(52) U.S. Cl. ...................................................... 385/114
(58) Field of Search ......................................... 385/114

(56) References Cited

U.S. PATENT DOCUMENTS

| | | | |
|---|---|---|---|
| 4,547,040 A | 10/1985 | Yamamoto et al. | 350/96.34 |
| 4,653,852 A | 3/1987 | Suzuki et al. | 350/96.33 |
| 4,752,112 A | 6/1988 | Mayr | 350/96.23 |
| 4,861,135 A | 8/1989 | Rohner et al. | 350/96.23 |
| 4,900,126 A | 2/1990 | Jackson et al. | 350/46.23 |
| 5,208,889 A | * 5/1993 | Cedrone et al. | 385/114 |
| 5,442,722 A | 8/1995 | DeCarlo | 385/114 |
| 5,457,762 A | 10/1995 | Lochkovic et al. | 385/114 |
| 5,524,164 A | 6/1996 | Hattori et al. | 385/114 |

(List continued on next page.)

FOREIGN PATENT DOCUMENTS

| | | | |
|---|---|---|---|
| EP | 0749129 B1 | 12/1996 | H01B/7/00 |
| EP | 0822432 A1 | 2/1998 | G02B/6/44 |
| EP | 0843187 A1 | 5/1998 | G02B/6/44 |
| EP | 0856761 A1 | 8/1998 | G02B/6/44 |
| JP | 1-138517 | 5/1989 | G02B/6/44 |
| JP | 1-138518 | 5/1989 | G02B/6/44 |
| JP | 1-251005 | 10/1989 | G02B/6/44 |
| JP | 07120645 A | 5/1995 | G02B/6/44 |
| JP | 08129122 A | 5/1996 | G02B/6/44 |
| JP | 08262292 A | 10/1996 | G02B/6/44 |
| JP | 09113773 A | 5/1997 | G02B/6/44 |
| JP | 09197213 A | 7/1997 | G02B/6/44 |
| JP | 09218328 A | 8/1997 | G02B/6/44 |
| WO | WO94/23323 | 10/1994 | G02B/6/44 |
| WO | WO97/05515 | 2/1997 | G02B/6/44 |

OTHER PUBLICATIONS

N. Andrew Punch, Jr., Shail K. Moorjani, Steven T. Bissell, and Karen E. Williams, Craft–Friendly 24–Fiber Ribbon Design, IWCS 1999, pp. 72–78.

R. S. Wagman, G. A. Lochkovic, K. T. White, "Component Optimization for Slotted Core Cables Using 8–Fiber Ribbons", IWCS 1995, pp. 472–478.

*Primary Examiner*—Chandrika Prasad
(74) *Attorney, Agent, or Firm*—Michael E. Carroll, Jr.

(57) ABSTRACT

A fiber optic ribbon having a first subunit and a second subunit. The first and second subunits including a plurality of respective optical fibers being connected by respective primary matrices. The first and second subunits being generally aligned along a plane with a secondary matrix contacting portions of the first and second subunits. The secondary matrix having at least one end portion and at least one medial portion. The at least one medial portion and the at least one end portion of the secondary matrix are separated by a gap along at least a portion of the longitudinal axis, thereby defining a preferential tear portion. In other embodiments, the at least one medial portion is recessed relative to the at least one end portion.

40 Claims, 2 Drawing Sheets

U.S. PATENT DOCUMENTS

| | | | |
|---|---|---|---|
| 5,598,498 A | 1/1997 | Comezzi | 385/114 |
| 5,673,352 A | 9/1997 | Bauer et al. | 385/114 |
| 5,717,805 A | 2/1998 | Stulpin | 385/114 |
| 5,761,363 A | 6/1998 | Mills | 385/114 |
| 5,933,559 A | 8/1999 | Petisce | 385/114 |
| 5,970,196 A | 10/1999 | Greveling et al. | 385/114 |
| 5,982,968 A | 11/1999 | Stulpin | 385/114 |
| 6,006,000 A * | 12/1999 | Tuttlebee | 385/114 |
| 6,018,605 A | 1/2000 | Mills et al. | 385/114 |
| 6,028,976 A | 2/2000 | Sato et al. | 385/114 |
| 6,097,866 A | 8/2000 | Yang et al. | 385/114 |
| 6,175,677 B1 * | 1/2001 | Yang et al. | 385/114 |
| 6,253,013 B1 * | 6/2001 | Lochkovic et al. | 385/114 |
| 6,309,567 B1 | 10/2001 | Okuno et al. | 264/127 |
| 6,337,941 B1 | 1/2002 | Yang et al. | 385/114 |
| 6,381,390 B1 | 4/2002 | Hutton et al. | 385/114 |
| 2002/0025128 A1 | 2/2002 | Hwang | |
| 2003/0223713 A1 * | 12/2003 | Chiasson et al. | 385/114 |

* cited by examiner

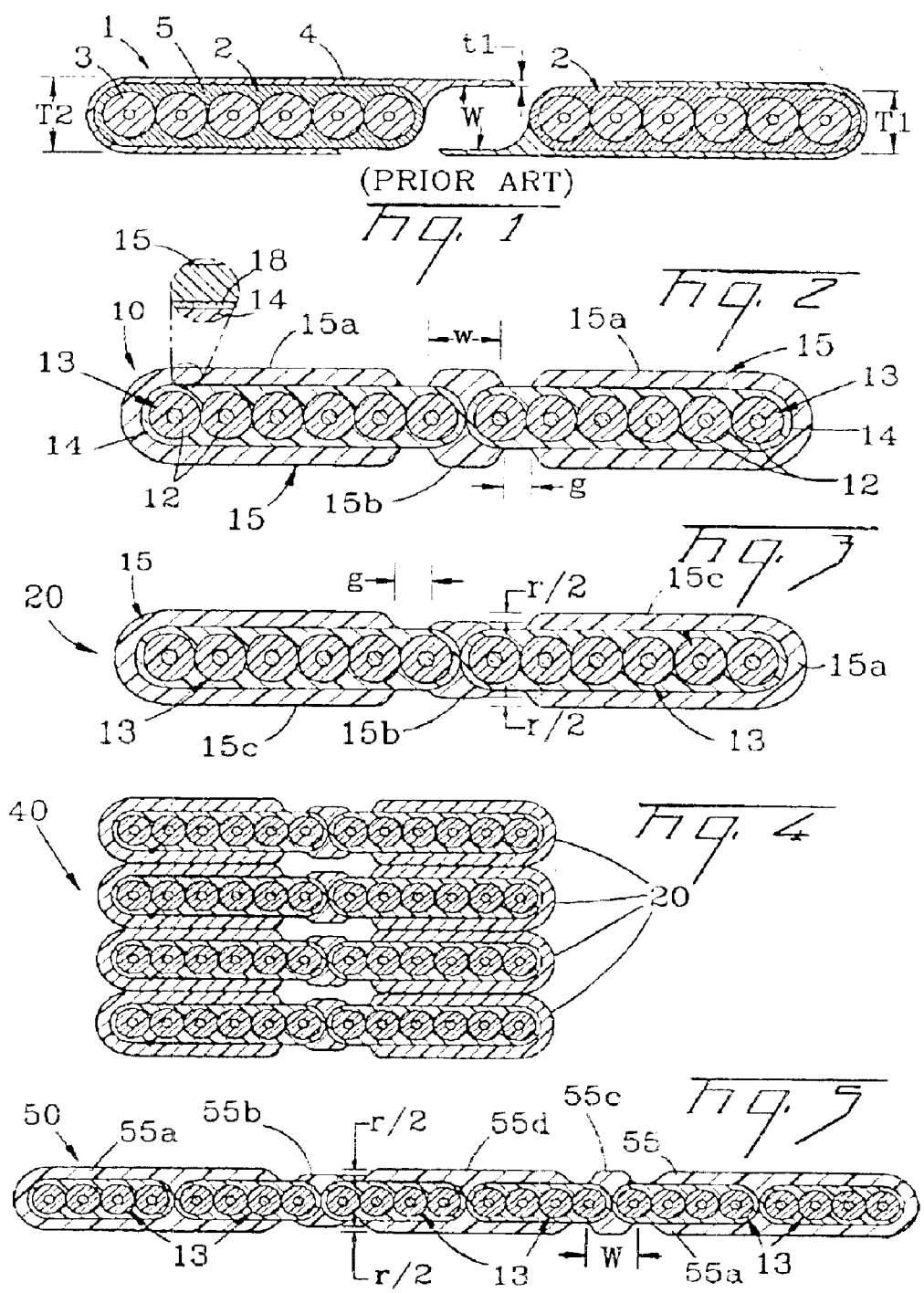

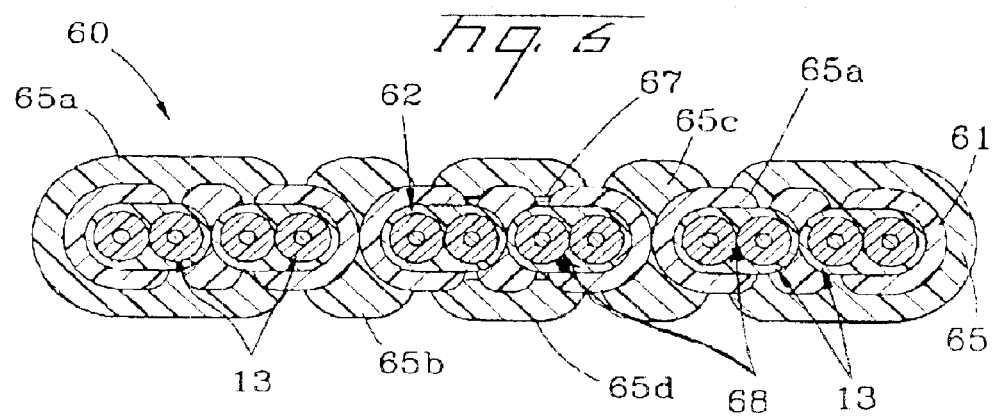
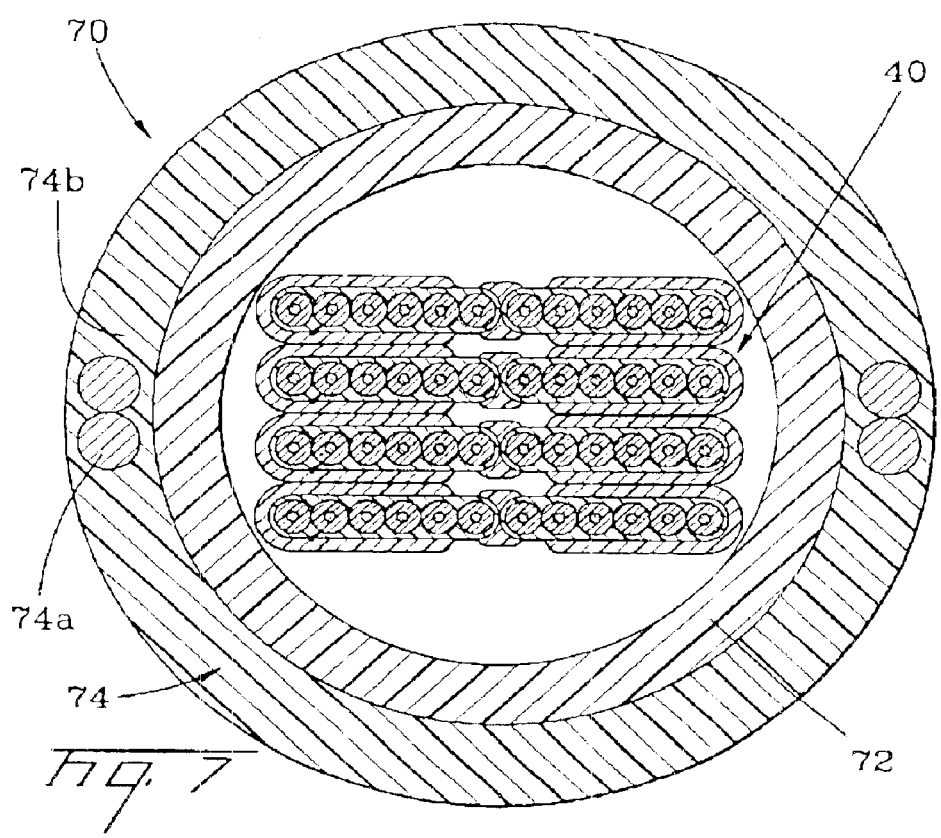

US 6,853,783 B2

OPTICAL FIBER RIBBONS HAVING PREFERENTIAL TEAR PORTIONS

FIELD OF THE INVENTION

The present invention relates generally to fiber optic ribbons. More specifically, the invention relates to fiber optic ribbons having preferential tear portions for separating the fiber optic ribbon into subunits.

BACKGROUND OF THE INVENTION

Fiber optic ribbons include optical waveguides such as optical fibers that transmit optical signals, for example, voice, video, and/or data information. Fiber optic cables using optical fiber ribbons can result in a relatively high optical fiberdensity. Fiber optic ribbon configurations can be generally classified into two general categories. Namely, fiber optic ribbons with subunits and those without. A fiber optic ribbon with a subunit configuration, for example, includes at least one optical fiber surrounded by a primary matrix forming a first subunit, and a second subunit having a similar construction, which are contacted and/or encapsulated by a secondary matrix. On the other hand, fiber optic ribbons without subunits generally have a plurality of optical fibers surrounded by a single matrix material.

Optical fiber ribbons should not be confused with microcables that, for example, have a strength member and a jacket. For instance, U.S. Pat. No. 5,673,352 discloses a micro-cable having a core structure and a jacket. The core structure requires that at least one optical fiber is positioned between longitudinally extending strength members, both of which are embedded in a buffer material. The jacket protects the core structure and the material is selected to have good adhesion to the buffer material and be abrasion resistant. Additionally, the strength members are required to have a larger diameter than the diameter of the optical fiber, thereby absorbing crushing forces that are applied to the cable.

On the other hand, optical fiber ribbons generally have a plurality of adjacent optical fibers arranged in a generally planar array forming a relatively high optical fiber density. Optical fiber ribbons without subunits can present problems for the craft. For example, when separating these optical fiber ribbons into optical fiber subsets, the craft must use expensive precision tools. Moreover, connectorization/splice procedures can require inventories of specialized splice and closure units/tools for the various subsets of optical fibers. Where the craft elects to separate the optical fiber ribbon into subsets by hand, or with a tool lacking adequate precision, stray optical fibers and/or damage to the optical fibers can result. Stray optical fibers can cause problems in optical ribbon connectorization, organization, stripping, and splicing. Additionally, damage to the optical fibers is undesirable and can render the optical fiber inoperable for its intended purpose.

However, there are fiber optic ribbon configurations that attempt to aid the separation of fiber optic ribbons without using subunits. For example, U.S. Pat. No. 5,982,968 requires an optical fiber ribbon of uniform thickness having V-shaped stress concentrations in the matrix material that extend along the longitudinal axis of the fiber optic ribbon. V-shaped stress concentrations can be located across from each other on the planar surfaces of the fiber optic ribbon, thereby aiding the separation of the fiber optic ribbon into subsets. However, the '968 patent requires a wider fiber optic ribbon because additional matrix material is required adjacent to the optical fibers near the V-shaped stress concentrations to avoid stray optical fibers after separation. A wider ribbon requires more matrix material and decreases the optical fiber density. Another embodiment of the patent requires applying a thin layer of a first matrix material around optical fibers to improve geometry control such as planarity of the optical fibers. Then V-shaped stress concentrations are formed in a second matrix applied over the first matrix material, thereby allowing separation of the subsets at the stress concentrations.

Another example of a separable fiber optic ribbon is described in U.S. Pat. No. 5,970,196. More specifically, the '196 patent requires a pair of removable sections positioned in V-shaped notches located across from each other on opposite sides of the planar surfaces of an optical fiber ribbon. The removable sections are positioned between adjacent interior optical fibers of the optical fiber ribbon to facilitate the separation of the optical fiber ribbon into subsets at the V-shaped notches. The removable sections can either be flush with the planar surfaces of the optical fiber ribbon, or they may protrude therefrom. These known fiber optic ribbons have several disadvantages. For example, they can be more expensive and difficult to manufacture. Additionally, from an operability standpoint, the V-shaped stress concentrations and/or V-shaped notches can undesirably affect the robustness of the optical fiber ribbon and/or induce microbending in the optical fibers.

Fiber optic ribbons that employ subunits to aid separation generally do not encounter these problems; however, they can have other problems. A conventional optical fiber ribbon 1 employing subunits encapsulated in a secondary matrix is shown in FIG. 1. Optical fiber ribbons having subunits can have several advantages, for example, improved separation, and avoidance of stray fiber occurrences. In particular, optical fiber ribbon 1 includes a pair of conventional subunits 2 having optical fibers 3 encapsulated in a primary matrix 5, which are then encapsulated in a secondary matrix 4. The thickness T1 of primary matrix 5 is continuous and uniform. Likewise, the thickness t1 of the secondary matrix 4 covering the planar portions of subunits 2 is continuous and uniform. For example, subunit 2 can include six 250 μm optical fibers 3 disposed in primary matrix 5 having an overall uniform thickness T1 of 310 μm and secondary matrix 4 has a thickness t1 of 10 μm for an overall fiber optic ribbon thickness T2 of 330 μm.

However, conventional optical fiber ribbon 1 has disadvantages. For example, one concern is the potential formation of wings W (FIG. 1) during hand separation of subunits 2. Wings W can be cause by, for example, a lack of sufficient adhesion between common matrix 4 and subunit matrix 5 and/or random fracturing of the secondary matrix during separation. The existence of wings W can negatively affect, for example, optical ribbon organization, connectorization, stripping, and/or splicing operations by the craft. Additionally, wings W can cause problems with ribbon identification markings, or compatibility of the subunit with ribbon handling tools, for example, thermal strippers, splice chucks, and fusion splicers.

SUMMARY OF THE INVENTION

The present invention is directed to a fiber optic ribbon having a first subunit, a second subunit, and a secondary matrix contacting portions of the first and second subunits. The first and second subunits include respective pluralities of optical fibers being connected by respective primary matrices and generally aligned along a plane. The secondary matrix has at least one end portion and at least one medial portion. The at least one medial portion and the at least one end portion are separated by a gap along at least a portion of the longitudinal axis, thereby defining a preferential tear portion.

The present invention is also directed to a fiber optic ribbon having a first subunit, a second subunit, arid a secondary matrix. The first and second subunits include respective pluralities of optical fibers being connected by respective primary matrices. The secondary matrix includes at least one end portion and a medial portion with both portions having a predetermined thickness. The medial portion is disposed adjacent to the interface between the first and second subunits. Additionally, the at least one end portion and at least one medial portion are spaced apart over at least a portion of the longitudinal axis of the ribbon, wherein the predetermined thickness of the medial portion is less than the predetermined thickness of the at least one end portion.

The present invention is further directed to a fiber optic ribbon having a longitudinal axis having a first subunit, a second subunit, and a secondary matrix contacting portions of the first and second subunits. The first and second subunits having respective pluralities of optical fibers being surrounded by respective primary matrices. The secondary matrix having a first end portion, a second end portion and a medial portion. The medial portion is disposed between the first end portion and the second end portion. The first end portion is spaced apart from the medial portion by a first gap over at least a portion of the longitudinal axis. Additionally, the second end portion is spaced apart from the medial portion by a second gap over at least a portion of the longitudinal axis.

BRIEF DESCRIPTION OF THE FIGS

FIG. 1 is a cross-sectional view of a conventional optical fiber ribbon according to the background of the present invention.

FIG. 2 is a cross-sectional view of a fiber optic ribbon according to one embodiment of the present invention.

FIG. 3 is a cross-sectional view of another fiber optic ribbon according to the present invention.

FIG. 4 is a cross-sectional view of a plurality of fiber optic ribbons of FIG. 3 arranged in a ribbon stack according to the present invention.

FIG. 5 is a cross-sectional view of another fiber optic ribbon according to the present invention.

FIG. 6 is a cross-sectional view of another fiber optic ribbon according to the present invention.

FIG. 7 is a cross-sectional view of a fiber optic cable according to the present invention.

DETAILED DESCRIPTION OF THE INVENTION

The present invention will now be described more fully hereinafter with reference to the accompanying drawings showing preferred embodiments of the invention. The invention may, however, be embodied in many different forms and should not be construed as limited to the embodiments set forth herein; rather, these embodiments are provided so that the disclosure will fully convey the scope of the invention to those skilled in the art. The drawings are not necessarily drawn to scale but are configured to clearly illustrate the invention.

Illustrated in FIG. 2 is a fiber optic ribbon 10 according to the present invention. Ribbon 10 can, for example, be used as a stand-alone ribbon, a portion of a ribbon stack, or as a subunit of a larger ribbon. Ribbon 10 includes two subunits 13 connected by a secondary matrix 15. Subunits 13 include a plurality of optical fibers 12 connected by a primary matrix 14. Primary matrix 14 generally fixes adjacent optical fibers together in an elongate structure generally inhibiting relative movement therebetween, thereby providing a robust subunit 13 for processing and handling. Although primary matrix 14 is shown to encapsulate respective optical fibers 12 of subunits 13 this is not required. Secondary matrix 15 includes at least one end portion 15a and at least one medial portion 15b. Medial portion 15b is generally disposed over an interface between subunits 13. Although medial portion 15b is shown to have generally flat planar surfaces it can have other suitable shapes such as arcuate or v-shaped. In this embodiment, ribbon 10 has two end portions 15a and one medial portion 15b connecting subunits 13 together, thereby forming a cross-section with a non-uniform thickness. Specifically, medial portion 15b of secondary matrix 15 is spaced apart from at least one of end portions 15a over at least a portion of the longitudinal axis of ribbon 10 by a gap g. As used herein, spaced apart or gap means essentially that little or no secondary matrix 15 is located over the matrix located below; however, trace amounts such as a thin film of secondary matrix can be located at this location.

As used herein, subunit means a plurality of optical fibers having a discrete matrix material thereon. In other words, each subunit has its own individual matrix material thereon. Subunits should not be confused with subsets, which are optical fibers arranged as groups having a common matrix material. When subunits are separated the discrete matrix material generally remains intact on the optical fibers of each subunit. Additionally, ribbons according to the concepts of the present invention can use other suitable numbers of optical fibers and/or subunits in the ribbons.

In the embodiment depicted in FIG. 2, medial portion 15b is spaced apart from both end portions 15a over at least a portion of the longitudinal axis of ribbon 10. However, the concepts of the present invention include having medial portion 15b spaced apart from only one end portion 15a. In preferred embodiments, medial portion 15b is spaced apart from at least one end portion 15a along a majority of the longitudinal axis of the ribbon. Moreover, medial portion 15b can have any suitable shape such as generally convex. Providing gap g between medial portion 15b and 15a allows for relatively easy hand separation of the subunits 13 without the formation of wings due to random fracturing of the secondary matrix. In other words, the gap provides for preferential tear portions of secondary matrix 15 between subunits 13. Moreover, if medial portion 15b remains adhered to one of the separated subunits 13 after separation of the same, it can easily be removed from that subunit without ripping, tearing, or removing the end portion of second matrix 15. Thus, it is possible for the craftsman to hand separate subunits quickly and efficiently. In this embodiment, medial portion 15b has a thickness that is about the same thickness as end portions 15a. However, other embodiments can tailor the dimensions related to the medial portion and/or gap g for desired performance characteristics. Performance characteristics can include robustness, twist performance, flexibility, force isolation, and/or separability. For example, ribbons of the present invention have a preferential robustness so that they can be twisted to a certain extent without unintentional separation.

FIG. 3 depicts ribbon 20 having medial portion 15b that is recessed relative to end portions 15b. For example, medial portion 15b can be recessed by a total of about 3 μm or more from major surfaces 15c of at least one end portion 15a; however, other suitable recess r dimensions can be used. In other words, major surfaces 15c of the medial portion 15b are each about 1.5 μm (r/2) below the plane formed by at least one major surface of end portion 15a for a total recess r of about 3 μm. Stated another way, the thickness of at least one end portion 15a is greater than the thickness of medial portion 15b. In other embodiments, recess r can be divided unequally between major surfaces 15c so that one side of medial portion 15b has a larger recess than the other major surface of the medial portion. Still another way to describe medial portion 15b is as a height h (riot labelled) referenced from a planar surface of subunit 13 to a high point of medial portion 15b. In other embodiments, medial portion 15b can have a height that is generally above major surface 15c of at least one end portion 15a.

Recessing medial portion 15b generally decreases the forces transferred to the ends of subunits 13 near the interface therebetween, thereby reducing undesired optical attenuation on edge fibers of subunit 13 adjacent to the interface when forces are applied, for example, during flexing and/or handling. Stated another way, the edge fibers of subunits 13 adjacent to the interface are susceptible to optical attenuation because the interface between subunits is a stress point where, for example, the ribbon can flex or bend, thereby applying compressive forces to the edge fibers that can cause optical attenuation. By recessing medial portions 15b, the ribbon flexibility and/or handleability is generally improved because the forces transferred to the edge fibers adjacent to the interface of subunits are generally reduced, thereby preserving optical performance of the same.

A width w of medial portion 15b can also be tailored for desired performance. For instance, width w can be about 600 μm or less; however, any other suitable dimensions can be used. Width w and recess r, along with material characteristics, can influence among other things the force required to separate subunits 13. Likewise, the dimension of gap g can influence ribbon characteristics such as flexibility and/or handleability of the ribbon. Gap g, for instance, can have a width of about 3 μm or greater, preferably about 5 μm or greater, up to about 600 μm; however, other suitable dimensions can be used. Additionally, using suitable predetermined matrix characteristics such as elongation to break and/or a predetermined matrix modulus can enhance the preferential tear portions of the ribbon.

Additionally, as disclosed in U.S. Pat. No. 6,253,013, of which the disclosure is incorporated herein by reference, an adhesion zone 18 (FIG. 2) can be used between a primary matrix and a secondary matrix. For example, an adhesion zone 18 is applied to primary matrix 14 using a Corona discharge treatment. Additionally, a marking indicia for identifying the ribbon can be disposed on either the primary matrix or the secondary matrix. In other embodiments, the secondary matrix can be used to identify the ribbon. For example, the secondary matrix can be colored with a dye for identification of the ribbon.

The present invention should not be confused with conventional ribbons having undulations across their crosssections surfaces due to manufacturing variances. These can cause variations in the conventional ribbon thickness at random locations, rather than, for example, predetermined shapes at predetermined locations. For example, the thickness of the conventional ribbon can be 310±3 μm at random locations across the cross-section. On the other hand, ribbons according to the present invention can have, for example, a non-uniform thickness, gap, and/or medial portion that increases or decreases at predetermined locations to aid separation performance.

In one embodiment, optical fibers 12 are a plurality of single-mode optical fibers; however, other types or configurations of optical fibers can be used. For example, optical fibers 12 can be multi-mode, pure-mode, erbium doped, polarization-maintaining fiber, other suitable types of light waveguides, and/or combinations thereof. For instance, each optical fiber 12 can include a silica-based core that is operative to transmit light and is surrounded by a silica-based cladding having a lower index of refraction than the core. Additionally, one or more coatings can be applied to optical fiber 12. For example, a soft primary coating surrounds the cladding, and a relatively rigid secondary coating surrounds the primary coating. The coating can also include an identifying means such as ink or other suitable indicia for identification and/or an anti-adhesion agent that inhibits the removal of the identifying means. However, optical fibers used in ribbons of the present invention generally are not tight-buffered. Suitable optical fibers are commercially available from Corning Incorporated of Corning, N.Y.

Primary matrix 14 can be, for example, a radiation curable material or a polymeric material; however, other suitable materials can be used. As known to one skilled in the art, radiation curable materials undergo a transition from a liquid to a solid when irradiated with predetermined radiation wavelengths. Before curing, the radiation curable material includes a mixture of formulations of, for example, liquid monomers, oligomer "backbones" with acrylate functional groups, photoinitiators, and other additives. Typical photoinitiators function by: absorbing energy radiated by the radiation source; fragmenting into reactive species; and then initiating a polymerization/hardening reaction of the monomers and oligomers. Generally, as a result of irradiation, a cured solid network of cross-linking is formed between the monomers and oligomers, which may include fugitive components. Stated another way, the photoinitiator begins a chemical reaction that promotes the solidification of the liquid matrix into a generally solid film having modulus characteristics.

One aspect of the curing process is the reaction of a photoinitiator in response to radiation exposure. A photoinitiator has an inherent absorption spectrum that is measured in terms of absorbance as a function of radiation wavelength. Each photoinitiator has a characteristic photoactive region, i.e., a photoactive wavelength range typically measured in nanometers (nm). For example, commercially available photoinitiators can have a photoactive wavelength range in the vacuum ultra-violet (160–220 nm), ultra-violet (220–400 nm), or visible light (400–700 nm) wavelength ranges.

The resulting modulus of radiation curable materials can be controlled by factors such as radiation intensity and cure time. The radiation dose, i.e., the radiant energy arriving at a surface per unit area is inversely proportional to the line speed, i.e., the speed the radiation curable moves past the radiation source. The light dose is the integral of radiated power as a function of time. In other words, all else being equal, the faster the line speed, the higher the radiation intensity must be to achieve adequate curing. After a radiation curable material has been fully irradiated, the material is said to be cured. Curing occurs in the radiation curable material from the side facing the radiation source down or away from the source. Because portions of the material closer to the radiation source can block radiation from reaching non-cured portions of the material, a cure gradient can be established. Depending on the amount of incident radiation, a cured material may exhibit different degrees of curing. Moreover, the degrees of curing in a material can have distinct modulus characteristic associated therewith. Conversely, radiation sources can be positioned so that the material has a relatively uniform cure.

Thus, the degree of cure affects the mechanical characteristics through the cross-link density of the radiation curable material. For example, a significantly cured material can be defined as one with a high cross-link density for that material, which is, for example, too brittle. Further, an undercured material may be defined as one having a low cross-link density, and can be too soft, possibly having a relatively high coefficient of friction (COF) that causes an undesirable level of ribbon friction. The cured UV material has a modulus, for example, in the range of about 50 MPa to about 1500 MPa depending on the radiation dose. Different modulus values can provide varying degrees of performance with respect to, for example, hand separability and robustness of the ribbons of the present invention.

In one embodiment, a UV curable material is used for primary matrix 14. For example, the UV curable material is a polyurethane acrylate resin commercially available from DSM Desotech Inc. of Elgin IL. such as 950-706. Alternatively, other suitable UV materials can be used, for example, polyester acrylate resin commercially available from Borden Chemical, Inc. of Columbus, Ohio. Additionally, thermoplastic materials such as polypropylene can be used as a matrix material.

Additionally, ribbons according to the present invention can have a secondary matrix with material characteristics such as adhesion, COF characteristics, or hardness that are different from primary matrix 14 of the subunit. This can be accomplished, for example, by using a secondary matrix material that is similar to primary matrix with different processing characteristics such as cure characteristics, and/or by using a material that is different than primary matrix. Likewise, different portions of a secondary matrix can have different materials and/or have distinct material characteristics, thereby tailoring performance characteristics.

FIG. 4 depicts a ribbon stack 40 according to the present invention. Specifically, ribbon stack 40 includes a plurality of ribbons 30 forming the stack. As shown, the recessed portions of adjacent ribbons are spaced apart. Thus, forces are inhibited from being transferred from adjacent ribbons at the recessed portion. For example, if a compressive force is applied to the ribbon stack, the edge optical fibers near the subunit interface are isolated from contact with adjacent ribbons, thereby inhibiting stress on the these optical fibers. Any of the ribbons of the present invention can be used in a ribbon stack with any suitable configuration. Moreover, the ribbon stack can be disposed within a tube and/or be a portion of a fiber optic cable.

FIG. 5 illustrates a ribbon 50 according to another embodiment of the present invention. Ribbon 50 includes six subunits 13 connected by a secondary matrix 55 having a nonuniform thickness. Secondary matrix 55 includes two end portions 55a, a first medial portion 55b, a second medial portion 55c, and a middle section 55d. Medial portions 55b, 55c are generally disposed over predetermined interfaces between subunits 13. In this embodiment, ribbon 50 has second and third subunits 13 (from left to right) connected by first medial portion 55b and fourth and fifth subunits 13 connected by second medial portion 55c. Additionally, end portions 55a each contact and/or connect two subunits 13, but in other embodiments the end portions can contact and/or connect more than two subunits. However, in other embodiments medial portions can be disposed about other subunit interfaces as desired. Positioning first and second medial portions 55b, 55c as shown allows the craftsman to easily separate ribbon 50 into three units each having eight optical fibers-in two subunits of four optical fibers. Thereafter, if necessary, the craftsman can separate any of the three individual units into separate subunits. In other words, ribbon 50 has a stronger preference for first tearing into three eight optical fiber units, then each of the three units can be separated into four optical fiber units if desired. As shown, middle section 55d is generally disposed between the first and second medial portions 55b, 55c and connects the third and fourth subunits together. However, the concepts of the present invention can use any suitable configuration of subunits and/or preferential tear portions.

For purposes of illustration, first and second medial portions 55b, 55c of secondary matrix 55 have different recess dimensions, but preferred embodiments have medial portions with similar recess dimensions. Specifically, as depicted first medial portion 55b is recessed from at least one end portion 55a and is also recessed relative to middle section 55d. On the other hand, second medial portion 55c generally has no recess. Likewise, as discussed, gap g and/or width w of medial portions 45b can have any suitable dimensions, thereby providing desired performance characteristics to ribbon 50. In this case, ribbon 50 has a plurality of gaps g that can exist over at least a portion of the longitudinal axis of ribbon 50. In preferred embodiments, the plurality of gaps g exist over a majority of the longitudinal axis of ribbon 50.

FIG. 6 illustrates a ribbon 60 according to another embodiment of the present invention. Ribbon 60 includes six two optical fiber subunits 13 connected by a secondary matrix 61, thereby forming a plurality of three ribbons 68 according to the concepts of the present invention. Additionally, ribbon 60 includes a third matrix 65 having two end portions 65a, a first medial portion 65b, a second medial portion 65c, and a middle section 65d. Medial portions 65b, 65c are generally disposed over predetermined interfaces between ribbons 68. In this embodiment, ribbon 60 has first and second ribbons 68 (from left to right) connected by first medial portion 65b and second and third ribbons 68 connected by second medial portion 65c. However, in other embodiments medial portions can be disposed about other ribbon interfaces as-desired. Positioning first and second medial portions 65b, 65c as shown allows the craftsman to easily separate ribbon 60 into three ribbon each having four optical fibers in two subunits of two optical fibers. Thus, ribbon 60 has two distinct matrices 61, 65 that employ the concepts of the present invention. Additionally, third matrix 65 can either fill the gaps of ribbons 61 as shown in the outboard locations or can be force to leave voids 67 in the gaps as shown in the center location.

FIG. 7 depicts a representative fiber optic cable 70 according to the present invention. Fiber optic cable 70 includes ribbon stack 40 disposed in a tube 72 having a sheath 74 therearound. Sheath 74 includes strength members 74a and a jacket 74. Although a monotube fiber optic cable design is depicted, the present invention can include ribbons in any suitable cable designs such as slotted core, drop cables, figure eight, loose tube, or interconnect cables. Moreover, fiber optic cable 70, or any other configuration, can include more, or fewer, cables components such as ripcords, armor layers, binder layers, strength members, water-swellable components, water-blocking materials, or any other suitable cable components.

Many modifications and other embodiments of the present invention, within the scope of the appended claims, will become apparent to a skilled artisan. For example, subunits can include different numbers of optical fibers, ribbons can have more than two subunits, or the ribbons can have other suitable configurations. Additionally, ribbons of the present invention can be part of a ribbon stack or include other suitable components. Therefore, it is to be understood that the invention is not to be limited to the specific embodiments disclosed herein and that modifications and other embodiments may be made within the scope of the appended claims. Although specific terms are employed herein, they are used in a generic and descriptive sense only and not for purposes of limitation. The invention has been described with reference to silica-based optical fibers, but the inventive concepts of the present invention are applicable to other suitable optical waveguides as well.

What is claimed is:

1. A fiber optic ribbon comprising:
   a first subunit, the first subunit including a first plurality of optical fibers, the first plurality of optical fibers being connected by a first primary matrix;
   a second subunit, the second subunit including a second plurality of optimal fibers, the second plurality of optical fibers being connected by a second primary matrix;
   the first and second subunits being-generally aligned along a plane;
   a secondary matrix contacting portions of the first and second subunits, the secondary matrix having at least one end portion and at least one medial portion, wherein the at least one medial portion and the at least one end portion are separated by a gap along at least a portion of the longitudinal axis, thereby defining a preferential tear portion.

2. The fiber optic ribbon according to claim 1, the at least one medial portion being recessed relative to the at least one end portion.

3. The fiber optic ribbon according to claim 2, the at least one medial portion being recessed relative to the at least one end portion by about 3 $\mu$m or more.

4. The fiber optic ribbon according to claim 1, the gap having a width of about 3 $\mu$m or greater.

5. The fiber optic ribbon according to claim 1, the at least one medial portion being generally disposed over an interface between the first subunit and the second subunit.

6. The fiber optic ribbon according to claim 1, the at least one medial portion having a width that is less than about 600 $\mu$m.

7. The fiber optic ribbon according to claim 1, the fiber optic ribbon having three or more subunits.

8. The fiber optic ribbon according to claim 7, the fiber optic ribbon having a first medial portion and a second medial portion and a first end portion and a second end portion.

9. The fiber optic ribbon according to claim 1, the fiber optic ribbon having at least four optical fibers.

10. The fiber optic ribbon according to claim 1, the at least one medial portion and at least one end portion being spaced apart over a majority of the longitudinal axis.

11. The fiber optic ribbon according to claim 1, the secondary matrix further comprising a first end portion and a second end portion.

12. The fiber optic ribbon according to claim 11, the first end portion and the second end portion both being spaced apart from the medial portion over a majority of the longitudinal axis.

13. The fiber optic ribbon according to claim 1, the secondary matrix having at least one predetermined material characteristic, and the first primary matrix having at least one predetermined material characteristic, wherein the at least one predetermined material characteristic of the secondary matrix is different than the at least one predetermined material characteristic of the first primary matrix.

14. The fiber optic ribbon according to claim 1, the secondary matrix having a Young's modulus of about 50 MPa or greater.

15. The fiber optic ribbon according to claim 1, the fiber optic ribbon having a third matrix contacting portions of the secondary matrix, the third matrix having at least one end portion and at least one medial portion, wherein the at least one medial portion and the at least one end portion are separated by a gap along at least a portion of the longitudinal axis, thereby defining a preferential tear portion.

16. The fiber optic ribbon according to claim 1, the fiber optic ribbon being a portion of a ribbon stack.

17. The fiber optic ribbon according to claim 1, the fiber optic ribbon being a portion of a fiber optic cable.

18. The fiber optic ribbon according to claim 1, the at least one end portion contacting two or more subunits.

19. A fiber optic ribbon comprising:
   a first subunit, the first subunit including a plurality of optical fibers, the plurality of optical fibers being connected by a first primary matrix;
   a second subunit, the second subunit including a plurality of optical fibers, the plurality of optical fibers being connected by a second primary matrix; and
   a secondary matrix, the secondary matrix comprising at least one end portion and a medial portion with both portions having a predetermined thickness, the medial portion being disposed adjacent to the interface between the first and second subunits, the at least one end portion and at least one medial portion being spaced apart over at least a portion of the longitudinal axis, wherein the predetermined thickness of the medial portion is less than the predetermined thickness of the at least one end portion.

20. The fiber optic ribbon according to claim 19, the thickness of the at least one end portion being about 3 $\mu$m or greater than the thickness of the medial portion.

21. The fiber optic ribbon according to claim 19, the at least one medial portion having a width that is less than about 600 $\mu$m.

22. The fiber optic ribbon according to claim 19, the fiber optic ribbon having three or more subunits.

23. The fiber optic ribbon according to claim 19, the fiber optic ribbon having a first medial portion and a second medial portion and a first end portion and a second end portion.

24. The fiber optic ribbon according to claim 19, the fiber optic ribbon having at least four optical fibers.

25. The fiber optic ribbon according to claim 19, the medial portion and at least one end portion being spaced apart over a majority of the longitudinal axis.

26. The fiber optic ribbon according to claim 19, the secondary matrix further comprising a first end portion and a second end portion.

27. The fiber optic ribbon according to claim 26, the first end portion and the second end portion both being spaced apart from the medial portion over a majority of the longitudinal axis.

28. The fiber optic ribbon according to claim 19, the secondary matrix having at least one predetermined material characteristic, and the first primary matrix having at least one predetermined material characteristic, wherein the at least one predetermined material characteristic of the secondary matrix is different than the at least one predetermined material characteristic of the first primary matrix.

29. The fiber optic ribbon according to claim 19, the secondary matrix having a Young's modulus of about 50 MPa or greater.

30. The fiber optic ribbon according to claim 19, the fiber optic ribbon being a portion of a ribbon stack.

31. The fiber optic ribbon according to claim 19, the fiber optic ribbon being a portion of a fiber optic cable.

32. The fiber optic ribbon according to claim 19, the fiber optic ribbon having a third matrix, the third matrix comprising at least one end portion and a medial portion, the medial portion being disposed adjacent to the interface between a first ribbon and a second ribbon, the at least one end portion and at least one medial portion being spaced apart over at least a portion of the longitudinal axis.

33. The fiber optic ribbon according to claim 19, the at least one end portion contacting two or more subunits.

34. A fiber optic ribbon having a longitudinal axis, comprising:

a first subunit, the first subunit including a plurality of optical fibers, the plurality of optical fibers being surrounded by a first primary matrix;

a second subunit, the second subunit including a plurality of optical fibers, the plurality of optical fibers being surrounded by a second primary matrix;

a secondary matrix contacting portions of the first and second subunits, the secondary matrix having a first end portion, a second end portion and a medial portion, the medial portion is disposed between the first end portion and the second end portion, wherein the first end portion is spaced apart from the medial portion by a first gap over at least a portion of the longitudinal axis and the second end portion is spaced apart from the medial portion by a second gap over at least a portion of the longitudinal axis.

35. The fiber optic ribbon according to claim 34, the first end portion and the second end portion defining a generally planar surface and the medial portion is recessed from the generally planar surface.

36. The fiber optic ribbon according to claim 34, the first end portion and the second end portion both being spaced apart from the medial portion over a majority of the longitudinal axis.

37. The fiber optic ribbon according to claim 34, the fiber optic ribbon having at least four optical fibers.

38. The fiber optic ribbon according to claim 34, the fiber optic ribbon being a portion of a ribbon stack.

39. The fiber optic ribbon according to claim 34, the fiber optic ribbon being a portion of a fiber optic cable.

40. The fiber optic ribbon according to claim 34, the first end portion contacting two or more subunits.

* * * * *